United States Patent [11] 3,627,723

[72] Inventors Thomas Joseph Kealy;
  William John Keller, both of Wilmington, Del.
[21] Appl. No. 787,250
[22] Filed Dec. 26, 1968
[45] Patented Dec. 14, 1971
[73] Assignee E. I. du Pont de Nemours and Company
  Wilmington, Del.

[54] FILLER LOADED ELASTOMERIC COMPOSITIONS HAVING IMPROVED EXTRUDABILITY AND PHYSICAL PROPERTIES
12 Claims, No Drawings
[52] U.S. Cl. ..................................................... 260/41.5 R,
  260/41.5 A, 264/170, 264/211
[51] Int. Cl. .......................................................C08c 11/14,
  C08c 11/18
[50] Field of Search............................................ 264/170,
  211; 260/41.5 A, 41.5 R, 29.7 T, 29.7 N, 29.7 O, 29.7 P

[56] References Cited
UNITED STATES PATENTS

| | | | |
|---|---|---|---|
| 2,668,785 | 2/1954 | Jefferson et al. | 117/4 |
| 2,735,790 | 2/1956 | Waitkus | 117/138.8 U |
| 3,288,709 | 11/1966 | Keller et al. | 252/8.75 |
| 3,361,691 | 1/1968 | Mazzeo | 260/23.5 |
| 3,408,320 | 10/1968 | Brucksch | 260/23.5 |

FOREIGN PATENTS

| | | |
|---|---|---|
| 1,104,662 | 2/1968 | Great Britain |
| 756,673 | 4/1967 | Canada |

OTHER REFERENCES

Condensed Chem. Dictionary (7th ed.) Reinhold N.Y. (1966) page 531 QD5c5

Waddell et al. Rubber Age 94, 427–428 and 435 (1963) Du Pont Publication TML-1 (1962)

Tordella SPE Journal, Feb. 1956, page 36.

Du Pont Development Products Report No. 18, ECD-330, A Sulfur-Curable Ethylene-Propylene Elastomer. Dec. 1961, pages 3–6.

*Primary Examiner*—Morris Liebman
*Assistant Examiner*—H. H. Fletcher
*Attorney*—Vernon R. Rice

ABSTRACT: An elastomeric composition containing (a) an α-olefin/nonconjugated diene copolymer, (b) a clay or carbon black filler and (c) a surfactant. The surfactant improves both the extrudability and vulcanizate properties of the copolymer.

3,627,723

FILLER LOADED ELASTOMERIC COMPOSITIONS HAVING IMPROVED EXTRUDABILITY AND PHYSICAL PROPERTIES

BACKGROUND OF THE INVENTION

Chain-saturated hydrocarbon copolymers of α-olefins are of great importance today for use in a wide variety of elastomeric articles. For many applications such as wire and cable coatings and shoe soles and heels, these copolymers are loaded with mineral, i.e., nonblack fillers prior to cure. For other applications such as brake diaphragms it is desirable to extend the α-olefin copolymer with a reinforcing carbon black. Improvements in processing and curing of both mineral and carbon black loaded stocks is a continuing objective. Improvements in extrusion rate and in vulcanizate properties such as compression set and tensile strength are particularly desirable.

It is known that some shortcomings in the properties of α-olefin hydrocarbon copolymer vulcanizates can be overcome if the filled stocks are specially heat treated prior to incorporation of the curing agent. This heat treatment is more effective if certain promoters are present during the heat-treatment such as dinitroso-, dioxime- and aromatic quinoid compounds. It is, however, quite inconvenient and expensive to carry out the heat treatment process. The extra time required to cool the heat-treated stocks before the curing agent can be added considerably lowers the production rate.

There is a need in the art, therefore, to improve the extrudability and vulcanizate properties of filler-loaded α-olefin/nonconjugated diene elastomeric stocks.

SUMMARY OF THE INVENTION

This invention provides a filler-loaded elastomer consisting essentially of (a) an elastomeric copolymer of at least one α-monoolefin and at least one nonconjugated hydrocarbon diene, said copolymer having about 0.1–2.0 gram moles of ethylenic unsaturation per kilogram of copolymer (b) about 20–300 parts by weight per 100 parts of copolymer of a filler, and (c) about 0.1–6.0 parts by weight of an interfacially active compound per 100parts of copolymer. Addition of interfacially active compounds (surfactants) to filler-loaded elastomeric stocks according to this invention improves the extrudability of the copolymer stock and the tensile strength and compression set of its vulcanizates.

DETAILED DESCRIPTION

The elastomeric copolymers used in this invention are those made from at least one α-monoolefin and at least one nonconjugated diene. The α-monoolefins have the structure $R-CH=CH_2$ where R is hydrogen or $C_1-C_{16}$ alkyl, preferably straight chained. Representative α-monoolefins are propylene, ethylene, 1-butene, 1-pentene, 1-hexene, 1-heptene, 1-octene, 1-octadecene, 6-ethyl-1-decene and 5-methyl-1-hexene.

The nonconjugated dienes useful in this invention can be open-chain or cyclic compounds. Preferably, only one of the double bonds is readily polymerizable by a coordination catalyst; terminal double bonds and the endocyclic double bond at the 2-position in unsaturated derivatives of 2-norbornene are typical of such active bonds. The open-chain dienes correspond to the formula

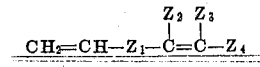

wherein $Z_1$ is $C_1-C_8$ alkylene and $Z_2$, $Z_3$ and $Z_4$ are independently hydrogen or an alkyl radical, with the proviso that the 2 groups indicated in said formula are selected such that the diene has from about six–22carbon atoms. Representative dienes are 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Open-chain dienes having two terminal nonconjugated carbon-to-carbon double bonds, where $Z_2$, $Z_3$ and $Z_4$ are hydrogen, e.g., 1,5-hexadiene or 1,4-pentadiene, can be used but are much less preferred. Cyclic nonconjugated dienes include dicyclopentadiene, 5-alkenyl-substituted-2-norbornenes, e.g., 5-butenyl-2-norbornene, 5-alkylidene-2-norborenens (including ethylidene-2-norbornenes and 5-methylene-2-norbornene), 2-alkyl-2,5-norbornadienes, (e.g., 2-ethyl-2,5-norbornadiene) and 1,5-cyclooctadiene. The preferred diene is 1,4-hexadiene because of the outstanding physical properties of the copolymers prepared therefrom.

Representative copolymers made from the above-described α-monoolefins and nonconjugated dienes and methods for their preparation are given in U.S. Pat. Nos. 2,933,480; 3,000,866; 3,063,973; 3,093,620; 3,093,621; 3,151,173; 3,260,708; and Belgian Pat. No. 697,049. Particularly preferred because of their excellent physical properties are copolymers of from about 30 to 70 weight percent ethylene, 60 to 20 weight percent propylene, and up to about 10 weight percent 1,4-hexadiene or 5-ethylidene-2-norbornene. The copolymers contain from about 0.1–2.0 and preferably about 0.2–1.0 gram moles of ethylenic unsaturation per kilogram of copolymer.

In preparing the compositions of this invention, the copolymers described above are compounded with a filler which can be a mineral (nonblack) filler, carbon black or mixtures thereof. A wide variety of mineral fillers or mixtures 697,049. can be employed in the present invention. Representative examples include: kaolin clay, calcined kaolin clay, magnesium silicate, blance fixe, whiting, silica and talc. Kaolin clay and calcined kaolin clay are particularly suitable. Any kaolin clay which is conventionally used for reinforcing elastomers can be employed to make the mixtures of the present invention. In general, these clays have particle sizes in the range of 2 microns. The finer the particle size, the better the filler responds in giving an improved vulcanizate.

The principal physical characteristics of the clays which are preferred for use in the present invention are: (1) a specific gravity of about 2.6; (2) a 325-mesh screen residue below about 3.5 percent, preferably below about 0.35 percent; (3) absorbed moisture content not about about 1 percent; (4) a particle size distribution wherein at least about 55 percent by weight of the particles are two microns or less in diameter; and (5) a pH (in water) of about 4.4 to 7, although specially prepared and treated clays may show pH values of 8 or higher.

The particularly valuable mineral filler is Kaolin clay. Both the "hard" and the "soft" types can be used; however, the hard clays are preferred. Those skilled in the art readily understand that kaolin clays may have identical crystalline structures, yet differ markedly in their ability to reinforce an elastomer stock. The difference in their reinforcing properties appears to depend upon the difference in their particle size distribution. Those skilled in the art will recognize that a hard clay is one which will noticeably reinforce an elastomer stock as reflected by the values of vulcanizate properties such as the modulus at 300 percent extension. In the case of the hard clays a very high proportion, for example about 90 percent, of the particles are smaller than 2 microns; in contrast, only about 60–70 percent of soft clay particles are less than 2 microns. Commercially available hard kaolin clays include: "Champion Clay," "Crown Clay," "Harwick No. 1," "Suprex Clay;" soft kaolins include: "Alumex R," "Hi-White R," "McNamee Clay," "Paragon Clay" and "Polyfil F."

Additional information on mineral fillers which is useful in carrying out this invention can be found in U.S. Pat. No. 3,355,417 to Martin and "*Reinforcement of Elastomers*," Edited by G. Kraus, Interscience Publishers, J. Wiley & Sons, Inc., N.Y., 1965.

When carbon black is the filler used, channel and furnace process blacks are preferred. SAF furnace black is an excellent reinforcing agent; other furnace blacks such as SRF, HMF, CF, HAF, and FF are satisfactory. Stocks containing channel blacks are slightly slower curing; however, any of them, e.g., EPC, MPC, HPC, CC can be used. Thermal carbons can be employed but provide a lower order of reinforcement.

The mineral fillers are used in the amount of about 20–300 parts per 100 parts of copolymer. When kaolin clay is the filler, the amounts are preferably in the range of 80–200 parts. Carbon black is used in the amounts of about 20–150 parts and preferably 30 to 80 parts per 100 parts of copolymer.

The surfactants used in this invention are selected classes of the cationic, anionic and nonionic types. Representative cationic surfactants correspond to the formula

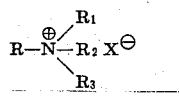

wherein R is a long chain alkyl, alkaryl or aralkyl group having from eight to 22 carbon atoms; $R_1$ and $R_2$ taken individually are $C_1$–$C_5$ alkyl and taken together with the nitrogen atom can form a five or six membered aliphatic or aromatic ring consisting of carbon atoms and not more than two hetero atoms, including the nitrogen atom shown, from the group of nitrogen and oxygen; $R_3$ is $C_1$–$C_{20}$ alkyl or benzyl and $X^{\ominus}$ is halide, nitrate, methanosulfate $(CH_3OSO_3)^{\ominus}$, or ethanosulfate $(CH_3-CH_2OSO_3)^-$. Examples of suitable cationic surfactants covered by this formula are: cetyl trimethyl ammonium chloride, stearyl dimethyl benzyl ammonium chloride, cetyl dimethyl ethyl ammonium bromide, cetyl dimethyl benzyl ammonium chloride, dodecyl trimethyl ammonium chloride, distearyl dimethyl ammonium chloride, N-cetyl-N-ethyl morpholinium ethanosulfate, N-dodecyl benzyl-N,N,N-trimethyl ammonium chloride, lauryl pyridinium chloride, lauryl isoquinolinium bromide, and stearyl trimethyl ammonium chloride. Another cationic surfactant not covered by the above formula is stearamido propyl dimethyl β-hydroxyethyl ammonium nitrate.

Representative anionic surfactants are alkali metal or ammonium sulfates, the anion of which has the formula $R_4OSO_3-$ wherein $R_4$ is $C_8$–$C_{20}$ alkyl or alkenyl; alkali metal or ammonium sulfonates, the anion of which has the formula $R_5SO_3-$ wherein $R_5$ is $C_8$–$C_{20}$ alkyl, $C_8$–$C_{20}$ alkaryl or $C_8$–$C_{20}$ aralkyl in which the aryl groups have six to 15 carbon atoms; alkali metal or ammonium phosphates, the anion of which has the formula $R_6OPO_3-$ wherein $R_6$ is the same as $R_5$ defined above; and alkali metal or ammonium phosphonates, the anion of which has the formula $R_7-PO_3-$ wherein $R_7$ is the same as $R_5$ defined above. In the anionic surfactants described herein, the ammonium ion has the formula

wherein Q, $Q_1$ and $Q_2$ are independently hydrogen, methyl, ethyl or hydroxy ethyl. Examples of anionic surfactants which correspond to the descriptions given above are sodium cetyl sulfate, sodium decyl sulfate, ammonium lauryl sulfate, potassium lauryl sulfate, oleyl sodium sulfate, sodium tetrahydronaphthalene sulfonate, polymethylene bisnaphthalene sodium sulfonate, ammonium undecylbenzene sulfonate, dodecylbenzene sodium sulfonate, dodecylbenzene triethanolamine sulfonate, potassium dodecyl phosphate, sodium lauryl phosphate, sodium dodecylbenzyl phosphonate and potassium cetyl phosphonate.

Other anionic surfactants not included by the above description are: the ammonium salt of monoethyl phenyl phenol monosulfonate, sodium oleyl p-anisidene sulfonate, lauryl picolinium p-toluene sulfonate, sodium salt of sulfonated propyl oleate, synthetic petroleum sulfonate (water cut, molecular weight 320); monobutyl biphenyl sodium monosulfate and the sodium salt of sulfated propyl oleate.

The nonionic surfactants include fatty alkylol amide condensates of the formula

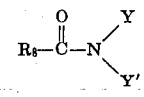

wherein $R_8$ is $C_8$–$C_{22}$ alkyl, alkaryl, alkenyl or aralkyl and Y and Y' are individually hydrogen or $C_1$–$C_4$ alkanol, with the proviso that not more than one of Y or Y' is hydrogen. Examples of such surfactants are hydroxyethyl stearamide, lauryl diethanolamide, myristic diethanolamide, stearic diethanolamide, and lauryl isopropanolamide.

Another important class of nonionic surfactants useful in this invention has the formula

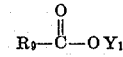

wherein $R_9=R_8$ and $Y_1$ is a monovalent radical derived from an aliphatic polyhydroxy compound having a molecular weight less than 250, such as sorbitol, pentaerythritol, glucose, propylene glycol and glycerine. Examples of these surfactants are sorbitan monopalmitate, propylene glycol monostearate, glyceryl monostearate, sorbitan monooleate, myristyl lactate, diethylene glycol monostearate and propylene glycol laurate. Other nonionic surfactants include mannide monooleate and sorbide dioleate.

Many of the surfactants described above are present in mixtures which contain complex unidentified materials usually obtained from natural sources. The properties of these materials are well known to those skilled in the art. Such mixtures can also be used in this invention.

The preferred surfactants are sorbitan monopalmitate, lauric diethanolamide and stearyl trimethylammonium chloride because of their special effectiveness in improving the extrudability of the copolymers and the physical properties of their vulcanizates.

The surfactants described above are added to the copolymer stock in the amount of about 0.1–6.0 parts per 100 parts of copolymer. The preferred quantity of surfactant is about 2–4 parts per 100 parts of copolymer since the advantages described herein are generally achieved at these concentrations. The surfactant can be added before, during or after the addition of other compounding agents. It should be thoroughly mixed with the copolymer, for example, by milling.

The elastomeric compositions of this invention can be readily cured with sulfur, peroxides, phenolic resins or radiation by conventional techniques to give outstanding vulcanizates. In curing with sulfur any of the procedures familiar to those skilled in the processing of natural rubber, butadiene/styrene rubber, butyl rubber and α-olefin/nonconjugated diene rubber, are suitable. It is preferable to use a combination of sulfur, a metal oxide, and a vulcanization accelerator. In general, about 0.2 to 3.5 parts of sulfur are used per 100 parts by weight of copolymer, although it is to be understood that larger or smaller concentrations can be used when deemed desirable. Further information regarding the sulfur curing α-olefin/nonconjugated diene copolymers appears in U.S. Pat. No. 3,865,418.

Detailed information on various types of cures applicable to this invention are: Phenolic resins cures —U.S. Pat. No. 3,287,440 and British Pat. No. 1,125,547; Peroxide cures — U.S. Pat. No. 3,033,835; Netherlands Pat. Publication No. 6,613,608 and British Pat. No. 1,120,352; Radiation cures are discussed in "Rubber Age" 77, Sept. 1955; and two applicable general references on the curing of rubbers are "Vulcanization of Elastomers," G. Alliger and I. J. Sjothun, Rheinhold Pub. Corp., N.Y. (1964) and "Vulcanization and Vulcanizing Agents," W. Hofmann, Palmerton Pub. Co., N.Y. (1965).

In addition to the interfacially active compound, filler, and curing system, the copolymer can be compounded with other conventional additives such as antioxidants, pigments, petroleum oils and the like. These additives can be introduced at any time prior to extrusion or before the cure begins. The presence of curatives does not affect the extrusion behavior. When shaped articles are made by extrusion, e.g., hose or coated wire, the curatives are added before extrusion (unless a radiation cure is employed).

The compounding can be carried out in conventional equipment such as rubber roll mills or internal mixers of the Banbury type. After the copolymer is banded on the mill, all remaining components can be added in any order except the curing agent which is added last. For processing convenience, the filler is often added simultaneously with petroleum oil. When internal mixers are employed which rapidly disperse the components and generate enough heat to raise the temperature to about 180°–200° F. all compounding components including the surfactants can be added practically simultaneously.

The cure time and temperature needed for optimum results for a particular operation can be routinely determined by those skilled in the art. At curing temperature of about 320° F., representative cure times range from about 5–30 minutes with about 10–20 minutes being preferred. The more difficulty cured compositions such as the hard clay extended stocks may require at least 20 minutes. Higher or lower temperatures than that indicated above can be employed, e.g., 300° F. and 360° F.

Addition of an interfacially active compound to clay-loaded copolymers according to this invention significantly increases the compounded polymer extrusion rate and improves compression set over cured stocks which are identical except the surfactant is not present. The extrusion rates are increased without a corresponding increase in die swell. The same advantages are realized with carbon black loaded stocks except the compression set is not necessarily improved by addition of the surfactant. These and other aspects of the invention are further illustrated by the examples which follow. The following procedures are used in carrying out the examples.

BANBURY MIXING PROCEDURES

A. Compounds for examples 1–6 are mixed in a "midget" Banbury mixer supplied by the Farrel Corporation of Ansonia, Connecticut. This equipment is described on page 16 of Farrel Corporation's bulletin number 207B, issued in 1964. The mixer has a 340-c.c. capacity. Unless otherwise indicated the actual mixing is accomplished by first adding the polymer to the mixer at a temperature of 90° F. and rotating the blades at 72 r.p.m. for 30 seconds. At this time, one half of the filler (containing half of the surfactant used) is added and mixing continued for an additional minute. Then, except for sulfur and accelerators, all remaining ingredients (including the remaining half of the filler containing half of the surfactant) are added and mixed for 4 minutes longer. During the last 3 minutes of the mixing, the speed of the blades is increased to 120 r.p.m. At the end of the mixing cycle of 6 minutes total, the blades are stopped and the compounded stock removed from the mixer and sheeted off of a conventional rubber mill.

B. The compound of example 7 is mixed in a Farrel Banbury mixer, size "OOC," having a chamber capacitor of 263 cubic inches. The mixing is allowed to continue until a temperature of 250° F. is reached at which time the charge is removed and sheeted off a rubber mill.

MILL MIXING PROCEDURE

In all cases, the curing agents are omitted from the extrusion stock. To illustrate curing behavior, these curing agents are then added to the extruded compound on a standard laboratory size water-cooled rubber mill. After thorough mixing of approximately 10 minutes duration, the fully compounded stock is sheeted from the mill at about 0.085 inch thickness.

CURING PROCEDURE

To minimize differentials of temperature and time during the cure step, all samples of each example are cured simultaneously in a multicavity, chrome-plated steel mold. Compounded stock of constant weight is placed in the cavity of the preheated mold. After closing the mold it is heated under normal ram pressure for the time and temperature indicated in the examples. After curing, the specimens are removed from the hot mold and cooled rapidly to room temperature.

EXTRUSION PROCEDURE

A. For examples 1–6 a commercial two-inch Royle No. 1 extruder is used together with a Royle three-zone Temp. Control Panel Board under the following general conditions (See John Royle & Sons Bulletin No. 463).

| Screw Type | Rubber (Royle AY 000298) |
| --- | --- |
|  | Plastic (Royle AY 000381) |
| Screw Working Length, | 22 5/16 inches |
| Screw Speed | 35 r.p.m. |
| Screw, °F. | 75 or 167 |
|  | (as described in Examples) |
| Die Orifice | 0.125 inch (rod) |
| Die, °F. | 212 |
| Head Temp. zone 1, °F. | 212 |
| Barrel Temp. zone 2, °F. | 160 |
| Zone 3, °F. | 140 |
| Feed Stock, °F | 75–105 |

The stock is fed by hand in strips about 1 ½ inch wide and one quarter inch thick. The extrudate is measured in terms of length vs. time and weight vs. length by taking cuts of 10 to 30 seconds duration over a period of from 1 to 3 minutes. From these measurements the maximum length rate (ft./min.) and the die swell at the maximum rate are determined. Die swell is defined in terms of the percent increase in cross section (area) observed for the extrudate vs. the cross section (area) of the die through which it is extruded. This is determined using the specific gravity of the compound and comparing the weight of a unit length of extrudate to the theoretical weight of a volume of the compound of unit length having the cross section of the die.

B. The stock of example 7 is extruded as a rod using a 1 ½ inch Royle extruder under the following conditions:

| Barrel Temp. | 270° F. |
| --- | --- |
| Die Head Temp. | 270° F. |
| Screw Temp. | 100° F. |
| Screw Speed | 35 r.p.m. |
| Die | ½-inch I.D. (circular), steel |
| Feed strip | ¼ inch ×2 inch |

TEST PROCEDURES FOR SAMPLES

The following procedures are used:

| Mooney Viscosity | ASTM D–1646–67 |
| --- | --- |
| Stress-Strain | ASTM D–412–66 |
| $M_{100}$ = Modulus at 100% extension (p.s.i.) | |
| $M_{300}$ = Modulus at 300% extension (p.s.i.) | |
| $T_b$ = Tensile strength at break (p.s.i.) | |
| $E_b$ = Elongation at break (%) | |
| Compression Set | ASTM D–395–67 (Method B) |
| Shore A Hardness | ASTM D–2234–64T |
| Permanent Set at Break | ASTM D–412–66 (Section 5.5 modified by use of a 5-minute hold time) |

The following materials are used in the examples:

EPH COPOLYMER A

A copolymer made by copolymerizing ethylene, propylene, and 1,4-hexadiene in tetrachloroethylene in the presence of a premixed coordination catalyst made by combining $VOCl_3$ and diethyl aluminum monochloride in accordance with the general procedure of U.S. Pat. No. 2,933,480. EPH Copolymer A typically has about 52.5 percent ethylene units, 44 percent propylene units, and 3.5 percent total 1,4-hexadiene units by weight; there is about 0.33 gram-mole of sulfur-curable unsaturation per kilogram. EPH Copolymer A has an inherent viscosity of about 4.0 (measured at 30° C. on a solution of 0.1 gram of copolymer in 100 milliliters of tetrachloroethylene); the Mooney viscosity (ML 4/250° F.) is about 70.

EPH COPOLYMER B

A copolymer made by copolymerizing ethylene, propylene, and 1,4-hexadiene in tetrachloroethylene in the presence of a coordination catalyst formed in situ by combining $VCl_4$ and diisobutyl aluminum monochloride in accordance with the general procedures of U.S. Pat. Nos. 2,933,480 and 3,051,690. EPH Copolymer B typically has about 63 percent ethylene, 33 percent propylene, and 4 percent total 1,4-hexadiene monomer units by weight; there is about 0.33 gram-mole of sulfur-curable unsaturation per kilogram. EPH Copolymer B has an inherent viscosity of about 2.29; the Mooney viscosity (ML-4/250° F.) is about 45.

EPH COPOLYMER C

A copolymer made by copolymerizing ethylene, propylene, and 1,4-hexadiene in tetrachloroethylene in the presence of a catalyst made in situ by combining $VCl_4$ and diisobutylaluminum monochloride in accordance with U.S. Pat. No. 2,933,480.

The copolymer contains 53.7 percent by weight ethylene, 42 percent by weight propylene and 4.3 percent by weight hexadiene. The ethylenic unsaturation is about 0.4 g-moles/kilogram of polymer; Mooney Viscosity (ML-4/250° F.) is 18.

HARD KAOLIN CLAY

The hard kaolin clay ("Suprex") is an air-floated type containing 44–46 percent silica, 37.5 39.5 percent alumina, 1.5–2 percent iron oxide, and 1–2 percent titanium dioxide by weight. The moisture content (maximum) is 1.0 percent by weight. The pH in water is 4.5–5.5. This clay has a specific gravity of 2.60, a 325-mesh screen residue of 0.17 percent (by weight), and the following particle size distribution (by weight): $10\mu$, 0.1 percent; $5-10\mu$, 28 percent; $4-5\mu$, 1.5 percent; $3-4\mu$, 2.3 percent; $2-3\mu$, 3.4 percent; $1-2\mu$, 9.0 percent; $0.5-1\mu$ 19.0 percent; $\mu$ $0.5\mu$, 61.9 percent.

PARAFFINIC OIL B

Paraffinic oil B has a flash point (COC) of 495° F., a molecular weight of 530, and a viscosity gravity constant of 0.803; the SUS viscosities at 100°/210° F. are 508/64.3.

SOFT KAOLIN CLAY

The soft Kaolin Clay ("Whitex") has a specific gravity of 2.5 and a pH (in water) of 6.2; about 55 percent of the particles are less than 2 microns in diameter.

CHLOROSULFONATED POLYETHYLENE

The chlorosulfonated polyethylene ("Hypalon") has a Mooney viscosity (ML—4/212° F.) of 30 and analyzes for 29 weight percent Cl and 1.4 weight percent S.

PARAFFINIC OIL A

This paraffinic oil has a flash point (COC) of 595° F., a molecular weight of 820, and a viscosity gravity constant of 0.796; the SUS viscosities at 100°/210°F. are 2907/165.

COPOLYMER D

A copolymer made by copolymerizing ethylene, propylene and 5-ethylidene-2-norbornene in hexane using a vanadium coordination catalyst according to general directions given in U.S. Pat. No. 3,341,503. The copolymer contains about 50.8 percent by weight ethylene, 45 percent by weight propylene and 4.2 percent by weight diene. The Mooney viscosity is 54.

Throughout the examples, as mentioned above, the extrusion data indicated is obtained on compounds which do not contain the curing system. Addition of the curing system to the copolymer does not significantly affect its extrudability. The samples which contain no surfactant are outside the scope of the invention.

EXAMPLE 1

An ethylene-propylene-1,4-hexadiene tripolymer is compounded as indicated above in the following recipe:

| Parts | |
|---|---|
| 100 | EPH Copolymer A |
| 1.0 | Stearic Acid |
| 30 | FEF Carbon Black |
| 125 | Hard Kaolin clay (Suprex) |
| 40 | Paraffinic Oil A |
| | Sorbitan surfactant shown in Table I) |

Two samples are extruded as described above using a chrome plated steel screw designed for plastics (screw temp. 167° F.) to give the results shown in table I.

TABLE I

| Sorbitan Monopalmitate | Max. Extrusion Rate ft./min. | % Die Swell |
|---|---|---|
| 0 | 8.5 | 162 |
| 3* | 20 | 204 |

*1 part of antioxidant also present ["Polygard" tri(mixed mono- and di-nonylphenyl) phosphite]

For vulcanization the following ingredients in the amounts indicated (based on 100 parts by weight of polymer) are added to the extrudates on a mill and the compound is cured in a press at 320° F. for 30 minutes: 2 sulfur, 0.5 mercaptobenzothiazole, 1 zinc dimethyldithiocarbamate, 5 zinc oxide. Vulcanizate properties are given in table II

TABLE II.—VULCANIZATE PROPERTIES

| Sorbitan monopalmitate | $M_{100}$ | $M_{300}$ | $T_B$ | $E_B$ | Hardness | Compression set, 22 hrs./ 70° C. |
|---|---|---|---|---|---|---|
| 0 | 225 | 450 | 2,110 | 875 | 50 | 62 |
| 3* | 225 | 450 | 2,265 | 745 | 52 | 40 |

EXAMPLE 2

Example 1 is repeated using EPH Copolymer B in place of EPH Copolymer A; all other conditions being the same, except no phosphite antioxidant is added. The results are shown in table III.

TABLE III.—EXTRUSION AND VULCANIZATE CHARACTERISTICS

| Sorbitan monopalmitate | Extrusion rate ft./min. | Percent die swell | $M_{100}$ | $M_{300}$ | $T_B$ | $E_B$ | Percent perm. set |
|---|---|---|---|---|---|---|---|
| 0 | 48 | 41 | 300 | 640 | 1,980 | 755 | 107 |
| 3 | 73 | 52 | 250 | 550 | 2,350 | 710 | 80 |

EXAMPLE 3

Example 2 is repeated using EPH Copolymer B in a different compound cured for 40 minutes at 320° F. A chrome plated steel screw designed for rubber is used in the extruder, but other conditions are the same. The compound recipe is as follows. Table IV gives the data obtained;

| | |
|---|---|
| EPH Copolymer B | 95 |
| Chlorosulfonated Polyethylene | 5 (Hypalon 40) |
| Zinc Oxide | 5 |
| Stearic Acid | 1 |
| Hard Kaolin Clay | 125 (Suprex Clay) |
| Soft Kaolin Clay | 75 (Whitex Clay) |
| Paraffinic Oil B | 70 (Sunpar 150) |
| Sulfur | 2 |
| 2-Mercaptobenzothiazole | 1.5 (MBT) |
| Tetramethylthiuram disulfide | 0.8 (Thiuram M) |
| Pentamethylenethiuram hexasulfide | 0.8 (Tetrone A) |
| Tellurium diethyldithiocarbamate | 0.8 (Tellurac) |
| Sorbitan Monopalmitate | (As shown in IV) |

TABLE IV.—VULCANIZATE PROPERTIES

| Sorbitan palmitate | Maximum extrusion rate, ft./min. | Percent die swell | $M_{100}$ | $M_{300}$ | $T_B$ | $E_B$ | Hardness | Compression set, 22 hrs. at 70° C. |
|---|---|---|---|---|---|---|---|---|
| 0 | 54 | 33 | 270 | 620 | 1,115 | 710 | 56 | 40 |
| 3 | 72 | 26 | 340 | 590 | 1,355 | 605 | 58 | 29 |

EXAMPLE 4

This example illustrates the effect of a variety of interfacially active compounds. The procedure is the same as followed in example 1 except EPH Copolymer B is used and a "rubber" screw is employed in the extruder. The stocks are cured for 30 minutes at 320° F.

EXAMPLE 5

In the previous 4 examples, the interfacially active compound is added to the polymer prior to compounding. In this example a comparison is made between adding the surfactant to the polymer and adding it to the compound along with the filler. The polymer type, compound recipe, screw type and cure conditions are the same as in example 4. Results are shown in table VI.

EXAMPLE 6

This example is a repeat of example 4 except the polymer is Copolymer "D" and the screw temperature is reduced to 75° F. The interfacially active material is added to the filler during compounding. A cure time of 15 minutes is included in this example for comparison with the longer cure times normally used.

TABLE VII

| Amount of sorbitan monopalmitate | Maximum extrusion rate, ft./min. | Percent die swell | Compound viscosity, ML 10 at 212° F. |
|---|---|---|---|
| 0 | 43 | 43 | 85 |
| 1 | 33 | 44 | 88 |
| 3 | 58 | 55 | 74 |
| 6 | 72 | 72 | 58 |

TABLE V.—EXTRUSION AND VULCANIZATE CHARACTERISTICS

| Interfacially active material | | Maximum extrusion rate, ft./min. | Percent die swell | $M_{100}$ | $M_{300}$ | $T_B$ | $E_B$ | Perm. set at break | Compression set "B," 22 hrs./70° C. | Shore A hardness |
|---|---|---|---|---|---|---|---|---|---|---|
| Amount | Type | | | | | | | | | |
| 0 | | 44 | 39 | 320 | 645 | 2,185 | 795 | 108 | 50 | 62.5 |
| 3 | ROSO$_3$Na[a] | 58 | 49 | 250 | 535 | 1,950 | 690 | 80 | 35 | 56 |
| 3 | Sorbitan monopalmitate | 70 | 56 | 290 | 640 | 2,190 | 625 | 72 | 37 | 61 |
| 3 | ArSO$_3$Na[b] | 75 | 49 | 300 | 660 | 2,315 | 670 | 84 | 32 | 58.5 |
| 3 | RCN(CH$_2$CH$_2$OH)$_2$[c] (‖ O) | 76 | 50 | 295 | 635 | 2,315 | 695 | 87 | 40 | 61.5 |
| 1.5 | RN$^+$(CH$_3$)$_3$Cl[d] | 82 | 58 | 265 | 550 | 2,470 | 700 | 84 | 37 | 59.5 |

[a] Where R is dodecyl.
[b] Where Ar is dodecylphenyl.
[c] Where R is undecyl.
[d] Where R is octadecyl.

TABLE VI

| Amount | Surfactant | Addition point | Maximum extrusion rate, ft./min. | Die swell | $M_{100}$ | $M_{200}$ | $T_B$ | $E_B$ | Shore A hardness | Compression Set "B," 22 hrs./70° C |
|---|---|---|---|---|---|---|---|---|---|---|
| 0 | None | | 46 | 44 | 290 | 590 | 1,740 | 830 | 59 | 56 |
| 3 | Sorbitan monopalmitate | To polymer | 65 | 66 | 250 | 465 | 1,820 | 725 | 56 | 41 |
| 3 | RN$^+$(CH$_3$)$_3$Cl[a] | do | 73 | 68 | 285 | 535 | 2,150 | 790 | 59 | 47 |
| 3 | R—C(=O)—N(CH$_2$CH$_2$OH)(CH$_2$CH$_2$OH)[b] | do | 69 | 79 | 300 | 565 | 2,075 | 730 | 61 | 43 |
| 3 | Sorbitan monopalmitate | To clay | 61 | 65 | 250 | 464 | 1,900 | 740 | 53 | 42 |
| 3 | RN$^+$(CH$_3$)$_3$Cl[a] | do | 75 | 67 | 285 | 550 | 2,000 | 750 | 58 | 47 |
| 3 | R—C(=O)—N(CH$_2$CH$_2$OH)(CH$_2$CH$_2$—OH)[b] | do | 75 | 78 | 285 | 565 | 2,100 | 750 | 59 | 42 |

[a] R is octadecyl.
[b] R is undecyl.

TABLE VIII.—VULCANIZATE DATA

| Amount of sorbitan monopalmitate | Cure, 320° F./15 min. | | | | | Cure, 320° F./30 min. | | | | | Shore A hardness | Compression Set "B" 22 hrs./70° C. |
|---|---|---|---|---|---|---|---|---|---|---|---|---|
| | $M_{100}$ | $M_{300}$ | $T_B$ | $E_B$ | Permanent set | $M_{100}$ | $M_{300}$ | $T_B$ | $E_B$ | Permanent set | | |
| 0 | 170 | 225 | 225 | 420 | 107 | 200 | 325 | 380 | 520 | 109 | 55 | 65 |
| 1 | 220 | 350 | 525 | 700 | 137 | 275 | 490 | 1,100 | 780 | 124 | 49 | 53 |
| 3 | 200 | 320 | 910 | 880 | 137 | 250 | 425 | 1,350 | 785 | 103 | 54 | 53 |
| 6 | 180 | 340 | 1,350 | 800 | 98 | 220 | 440 | 1,625 | 715 | 81 | 51 | 50 |

EXAMPLE 7

Ethylene-propylene-hexadiene Tripolymer C is compounded in the following formulation:

| Polymer | 100 |
|---|---|
| Zinc oxide | 5 |
| HAF Black | 30 |
| Agerite Resin D | 2 (Polymerized 2,2,4-tirmethyl-1,2-dihydroquinoline) |
| Bis($\alpha,\alpha$-diemthyl-benzyl)peroxide (40% active ingredient supported on precipitated calcium carbonate) | 10 |

TABLE IX.—EXTRUSION DATA

| Amount of sorbitan monopalmitate | Feed characteristics | Extrudate surface | Max. rate, in./min. | Min. rate, in./min. | Extrudate temp. °F. |
|---|---|---|---|---|---|
| 0 | Erratic | Rough | 58 | 28 | 255 |
| 2 | Good | Smooth | 74 | 58 | 240 |

TABLE X.—VULCANIZATE DATA (6 MIN. AT 370° F.)

| Amount of sorbitan monopalmitate | $M_{100}$ | $T_B$ | $E_B$ | Hardness | Compression set, 22 hrs./302° F. | After 70 hrs./302° F. $T_B$ |
|---|---|---|---|---|---|---|
| 0 | 270 | 1,575 | 280 | 58 | 13 | 1,870 |
| 2 | 270 | 1,845 | 310 | 57 | 14.7 | 1,845 |

What is claimed is:

1. A filler-loaded elastomer consisting essentially of in parts by weight (a) an elastomeric copolymer of at least one $\alpha$-monoolefin and at least one nonconjugated hydrocarbon diene, said copolymer having about 0.1–2.0 gram-moles of ethylenic unsaturation per kilogram of copolymer; (b) about 20–300 parts per 100 parts of copolymer of a clay or carbon-black filler, with the proviso that when the filler is carbon black, there is not more than about 150 parts of filler; and (c) about 0.1–6.0 parts per 100 parts of copolymer of an interfacially active compound from the group consisting of 1. cationic surfactants of the formula

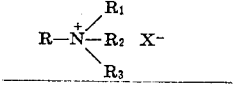

wherein R is an alkyl, alkaryl or aralkyl group containing about eight to 22 carbon atoms, $R_1$ $R_2$ individually are $C_1$–$C_5$ alkyl or are joined together to form a 5 or 6 membered aliphatic or aromatic ring consisting of carbon atoms and not more than two hetero atoms, including the nitrogen atom shown, from the group of nitrogen and oxygen, $R_3$ is $C_1$–$C_{20}$ alkyl or benzyl, and $X^-$ is halide, nitrate, menthanosulfate ($CH_3OSO_3$)BY– or ethanosulfate ($CH_3CH_2OSO_3$)–;

2. anionic surfactants which are:
   a. alkali metal or ammonium sulfates, the sulfate anion of which has the formula: $R_4OSO_3^-$ wherein $R_4$ is $C_6$–$C_{20}$ alkyl or $C_8$–$C_{20}$ alkenyl;
   alkali metal or ammonium sulfonates, the anion of which has the formula $R_5SO_3^-$ wherein $R_5$ is a $C_8$–$C_{20}$ alkyl, $C_8$–$C_{20}$ alkaryl, or $C_8$–$C_{20}$ aralkyl, wherein the aryl groups have six to 15 carbon atoms;
   c. alkali metal or ammonium phosphates, the anion of which has the formula $R_6OPO_3^-$ wherein $R_6$=$R_5$;
   d. alkali metal or ammonium phosphonates, the anion of which has the formula $R_7$—$PO_3^-$ wherein $R_7$=$R_5$; and
   e. the ammonium salt of monoethyl phenyl phenol monosulfate, sodium oleyl p-anisidine sulfonate, lauryl picolinium p-toluene sulfonate, the sodium salt of sulfonated propyl oleate, monobutyl biphenyl sodium monosulfate and the sodium salt of sulfated propyl oleate; wherein the ammonium ions of the anionic surfactants described above have the formula

wherein Q, $Q_1$ and $Q_2$ are independently hydrogen, methyl, ethyl or hydroxy ethyl;

3. nonionic surfactants of the formula

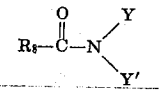

wherein $R_8$ is $C_8$–$C_{22}$ alkyl, alkaryl, alkenyl or aralkyl and Y and Y' are individually hydrogen or a $C_1$–$C_4$ alkanol radical, with the proviso that not more than one of Y or Y' is hydrogen; and nonionic surfactants of the formula

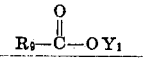

wherein $R_9$=$R_8$ and $Y_1$ is a monovalent radical derived from an aliphatic polyhydroxy compound having a molecular weight less than 250.

2. A composition of claim 1 wherein the filler is hard kaolin clay.

3. A composition of claim 1 wherein the copolymer is prepared from about 30–70 weight percent ethylene, 60–20 weight percent propylene, and up to about 10 weight percent 1,4-hexadiene or 5-ethylidene-2-norbornene.

4. A composition of claim 3 wherein the diene is 1,4-hexadiene.

5. A composition of claim 1 wherein the surfactant is sorbitan monopalmitate, lauric diethanolamide or stearyl trimethylammonium chloride.

6. A composition of claim 1 wherein the surfactant is sorbitan monopalmitate.

7. A composition of claim 1 wherein the filler is a hard kaolin clay present in the amount of about 80–120 parts by weight per 100 parts of copolymer; the copolymer consists essentially of about 30–70 weight percent ethylene, about 60–20 weight percent propylene and up to about 10 percent 1,4-hexadiene; and the surfactant is sorbitan monopalmitate.

8. A composition of claim 1 wherein the filler is carbon black present in the amount of about 30–80 parts by weight.

9. A vulcanizate prepared by curing a composition of claim 1 with sulfur.

10. A vulcanizate prepared by curing a composition of claim 6 with sulfur.

11. A vulcanizate prepared by curing a composition of claim 1 in which the filler is carbon black with a peroxide.

12. A vulcanizate prepared by curing a composition of claim 7 with sulfur.

* * * * *